Sept. 25, 1951  S. I. BURD ET AL  2,569,398
ORNAMENTED STOCKING
Filed April 6, 1951
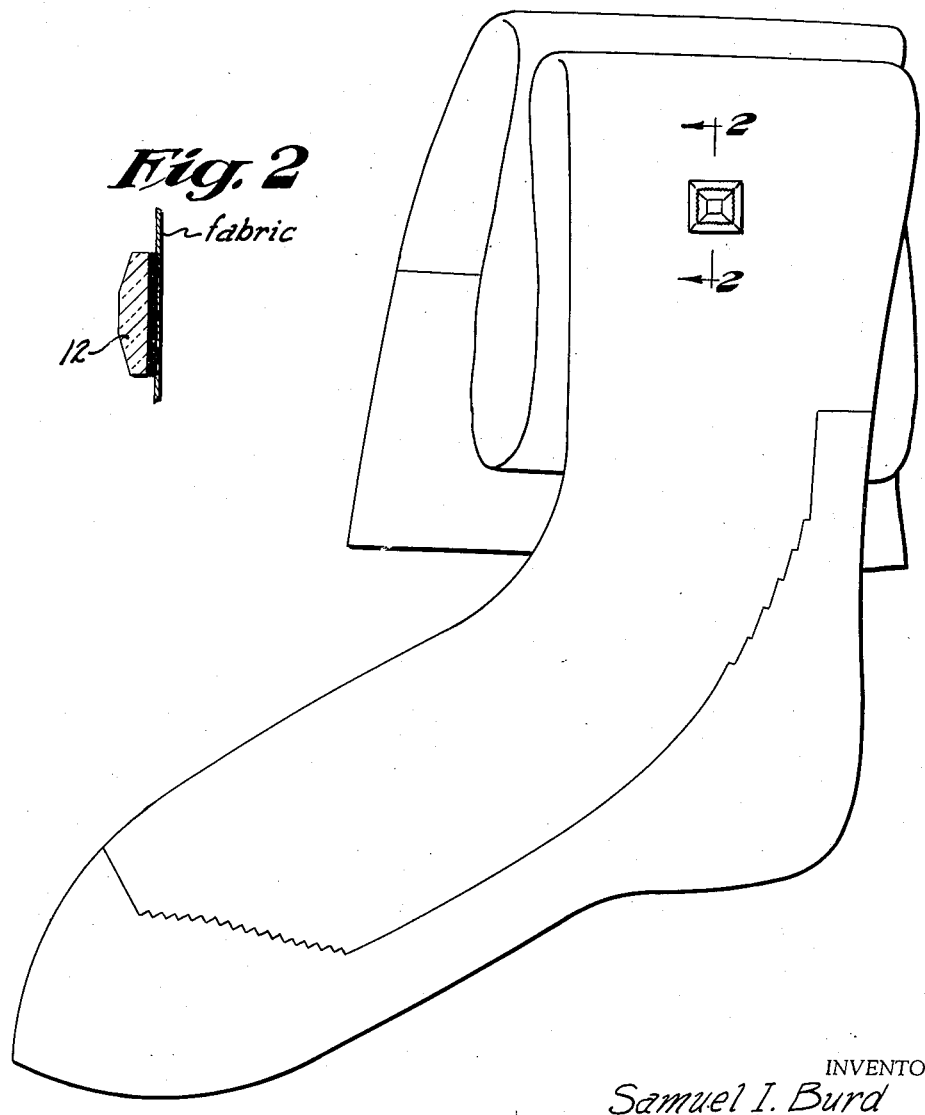
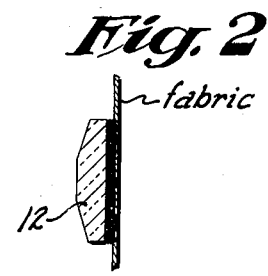
INVENTOR
Samuel I. Burd
Joseph V. Clarke
BY  Louis Necho
ATTORNEY Patented Sept. 25, 1951

2,569,398

UNITED STATES PATENT OFFICE 2,569,398

ORNAMENTED STOCKING

Samuel I. Burd, New York, and Joseph V. Clarke, Flushing, N. Y., assignors to Prestige, Inc., New York, N. Y., a corporation of Pennsylvania Application April 6, 1951, Serial No. 219,570

3 Claims. (Cl. 41—34)

Our invention relates to an ornamented stocking and the method of making the same. More particularly, our invention relates to the decoration of stockings made of synthetic, thermoplastic material with ornaments which are also made of synthetic, thermoplastic material, by fusion of either or both of the materials permanently to integrate the same.

In the accompanying drawings:

Fig. 1 is a side elevational view of a stocking provided with an ornament.

Fig. 2 is an enlarged sectional view taken on line 2—2 on Fig. 1.

The ornament applied to the stocking may be of any desired shape, color, size or material. For example, it may be of metal, of glass, of plastic, or ceramic or of a combination of these or any other materials.

As shown in Fig. 2, the ornament 12 is made of glass or similar material and is applied to the outside of the stocking. The ornament is secured permanently in position by applying heat to the ornament, or to the other side of the stocking, to fuse the stocking fabric and cause it to adhere to the contacting face of the ornament. It is of course understood that the stocking is, in this case, knit of synthetic yarn such as "nylon" or "rayon" which are thermoplastic. If the ornament is also made from some thermoplastic material, such as cellulose xanthate or methyl methacrylate, and if the fusing temperature of the particular material used for making the ornament is the same as that of the stocking the heat will cause the contacting faces of the ornament and of the stocking to fuse and flow together. If the ornament is made of a thermoplastic material the fusing temperature of which is below that of the stocking, the face of the ornament contacting the stocking will be fused onto the fabric of the stocking.

It will be noted that the heat applied is sufficient to fuse the material of the stocking or of the contiguous face of the ornament; that is, to render it momentarily adhesive, by producing an adhesive surface film without melting the material itself. This is important because, if the sheer material is melted, it will adhere altogether to the ornament, or vice-versa, and instead of securing the ornament to the stocking it will leave a hole. Likewise, the pressure applied need be only sufficient to bring the adhesive film into complete physical contact with the opposite surface but such pressure must not operate to displace or distort the fused material.

The ornament may also be permanently secured by coating the face thereof which abuts the stocking with a thermoplastic adhesive so that, when heated, it will fuse onto the stocking fabric without fusing the latter.

What we claim is:

1. The combination with a fabric formed of a thermoplastic material of an ornament secured to said fabric by fusion of the surface of the fabric onto the contacting surface of said ornament.

2. The combination with a fabric formed of a thermoplastic material, of an ornament formed of thermoplastic, said fabric and said ornament being secured together by fusion of their contacting surfaces.

3. The method of ornamenting a fabric which is formed of a thermoplastic material, said method including the step of placing an ornament on one side of the fabric and the step of applying heat, of an order sufficient to fuse but not to melt said fabric, to the other side of said fabric and finally applying pressure to said fabric and said ornament.

SAMUEL I. BURD.
JOSEPH V. CLARKE.

REFERENCES CITED

The following references are of record in the file of this patent:

UNITED STATES PATENTS

| Number | Name | Date |
| --- | --- | --- |
| 1,140,975 | Frankel | May 25, 1915 |
| 1,589,158 | Hedison | June 15, 1926 |
| 2,062,336 | Sexton | Dec. 1, 1936 |
| 2,397,743 | Kaphan | Apr. 2, 1946 |